(12) United States Patent
Louzon et al.

(10) Patent No.: US 6,499,379 B1
(45) Date of Patent: Dec. 31, 2002

(54) TRANSMISSION WITH INDEPENDENTLY SEPARABLE MAIN AND AUXILIARY SECTIONS

(75) Inventors: Thomas Mark Louzon, Laurinburg, NC (US); José Felipe Peláez, Southern Pines, NC (US); Ken Picone, Pinehurst, NC (US); Randy P. Kruse, Southern Pines, NC (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 541 days.

(21) Appl. No.: 08/965,107

(22) Filed: Nov. 6, 1997

(51) Int. Cl.[7] ............................................... F16H 57/02
(52) U.S. Cl. ..................................................... 74/606 R
(58) Field of Search ................................. 74/606 R, 331

(56) References Cited

U.S. PATENT DOCUMENTS

| | | | | |
|---|---|---|---|---|
| 4,481,836 A | * | 11/1984 | Richards | 74/606 R X |
| 4,807,493 A | * | 2/1989 | Loeffler | 74/331 X |
| 5,370,014 A | * | 12/1994 | Pigozzi et al. | 74/606 R X |
| 5,623,851 A | * | 4/1997 | Ooyama et al. | 74/331 X |

* cited by examiner

*Primary Examiner*—Chong H. Kim
(74) *Attorney, Agent, or Firm*—Carlson, Gaskey & Olds

(57) ABSTRACT

A transmission includes a main section substantially enclosed by a main case and an auxiliary section substantially enclosed by an auxiliary case. An intermediate plate is removably secured to the main case and to the auxiliary case. The intermediate plate includes bearings for supporting the main shaft and countershafts. The main section and auxiliary sections can each be accessed and serviced without disturbing the other.

13 Claims, 3 Drawing Sheets

TRANSMISSION WITH INDEPENDENTLY SEPARABLE MAIN AND AUXILIARY SECTIONS

BACKGROUND OF THE INVENTION

The present invention relates generally to a transmission having a main section and an auxiliary section and more particularly to a transmission in which the main section and auxiliary, section can each be removed and serviced independently of the other.

The present invention relates to those transmissions having main sections connected in series with auxiliary sections. Generally a main shaft is rotatably mounted along with one or more main countershafts in a main case. The main case generally comprises a generally cylindrical sidewall having a removable front wall and an integral intermediate wall opposite the front wall. The auxiliary section includes an auxiliary shaft and one or more auxiliary countershafts mounted in an auxiliary case having a generally cylindrical sidewall integral with a rear wall. The auxiliary case is removably secured to the main case adjacent the intermediate wall. Bearings in the intermediate wall support the main shaft and countershafts.

Assembly of the known transmission is difficult. Shafts and gears must be loaded through the front cover opening. The bearings are difficult to install and are easily damaged during the assembly process. Timing of the main shaft with the countershafts is difficult because the countershafts must be supported while assembling the main shaft. Service of the main section in the known transmission is also difficult. In order to access the main section of the transmission, the auxiliary case must also be removed. Further, some bearings must be removed before the main section can be disassembled.

SUMMARY OF THE INVENTION

The present invention provides a transmission having an intermediate plate between the main case and the auxiliary case which is removably mounted to the main case and the auxiliary case. The intermediate plate also supports the bearings for the countershafts and the main shaft. As a result, each of the main case and auxiliary case can be removed from the intermediate plate without disturbing the other.

Preferably, the main case and the auxiliary case each include a flange adjacent the intermediate plate. A plurality of long bolts are inserted through apertures in the flange of the auxiliary case, apertures through the intermediate plate and threaded into threaded bores in the flange of the main case. Further, a plurality of short bolts are inserted through apertures through the flange in the main case and threaded into bores in the intermediate plate. Similarly, short bolts are inserted through apertures in the flange of the auxiliary case and threaded into threaded bores in the intermediate plate. Preferably, the threaded bores in the intermediate plate extending from the front surface are coaxial with those extending from the rear surface. During disassembly, all of the long bolts are removed. Then, only half of the short bolts are removed, i.e. either those short bolts securing the main case to the intermediate plate or those short bolts securing the auxiliary case to the intermediate plate. Therefore, the main case or the auxiliary case can be removed while the other case is retained by the remaining short bolts.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
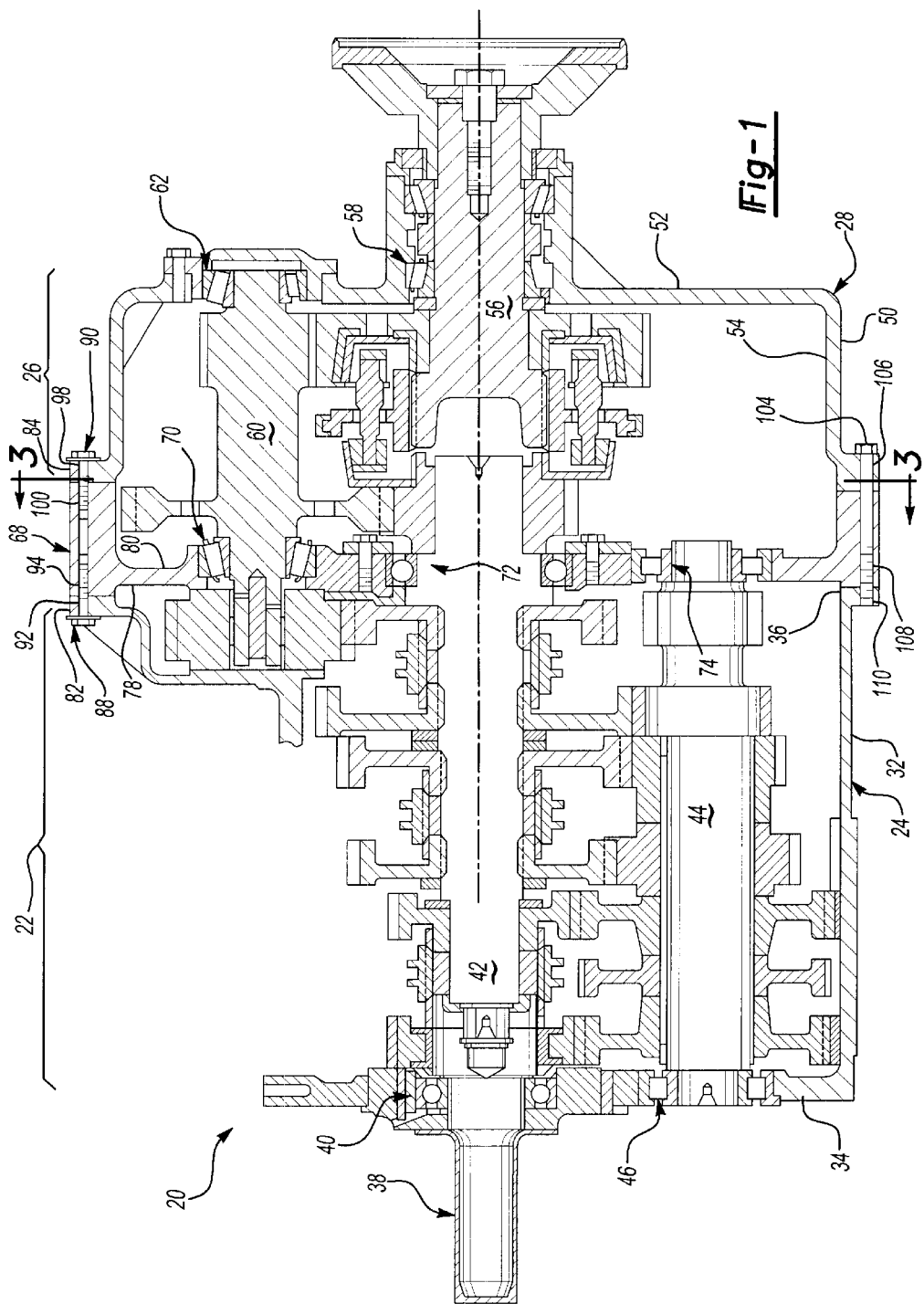
FIG. 1 is a sectional view of the transmission of the present invention.

A transmission 20 according to the present invention generally comprises a main section 22 substantially enclosed by a main case 24 and an auxiliary section 26 substantially enclosed by an auxiliary case 28. The main case 24 comprises a generally cylindrical side wall 32 integral with a forward wall 34. The side wall 32 defines a rear opening 36 opposite the forward wall 34. An input shaft 38 is rotatably supported by an input bearing 40 mounted in the forward wall 34. A main shaft 42 is rotatably supported by the input shaft 38. A pair of main countershafts 44 (one shown) are each rotatably supported by a main countershaft bearing 46 (one shown) mounted in the forward wall 34.

The auxiliary case 28 generally comprises a generally cylindrical side wall 50 integral with a rearward wall 52 opposite a forward opening 54. An auxiliary shaft 56 is rotatably supported by an auxiliary bearing 58 mounted in the rearward wall 52. A pair of auxiliary countershafts 60 (one shown) are each supported by an auxiliary countershaft bearing 62 (one shown) mounted in the rearward wall 52.

The main case 24 and auxiliary case 28 are each removably mounted to an intermediate plate 68. The auxiliary countershaft bearings 70 (one shown), main shaft bearings 72, and main countershaft bearings 74 (one shown) are all mounted in the intermediate plate 68.

Figure 2:
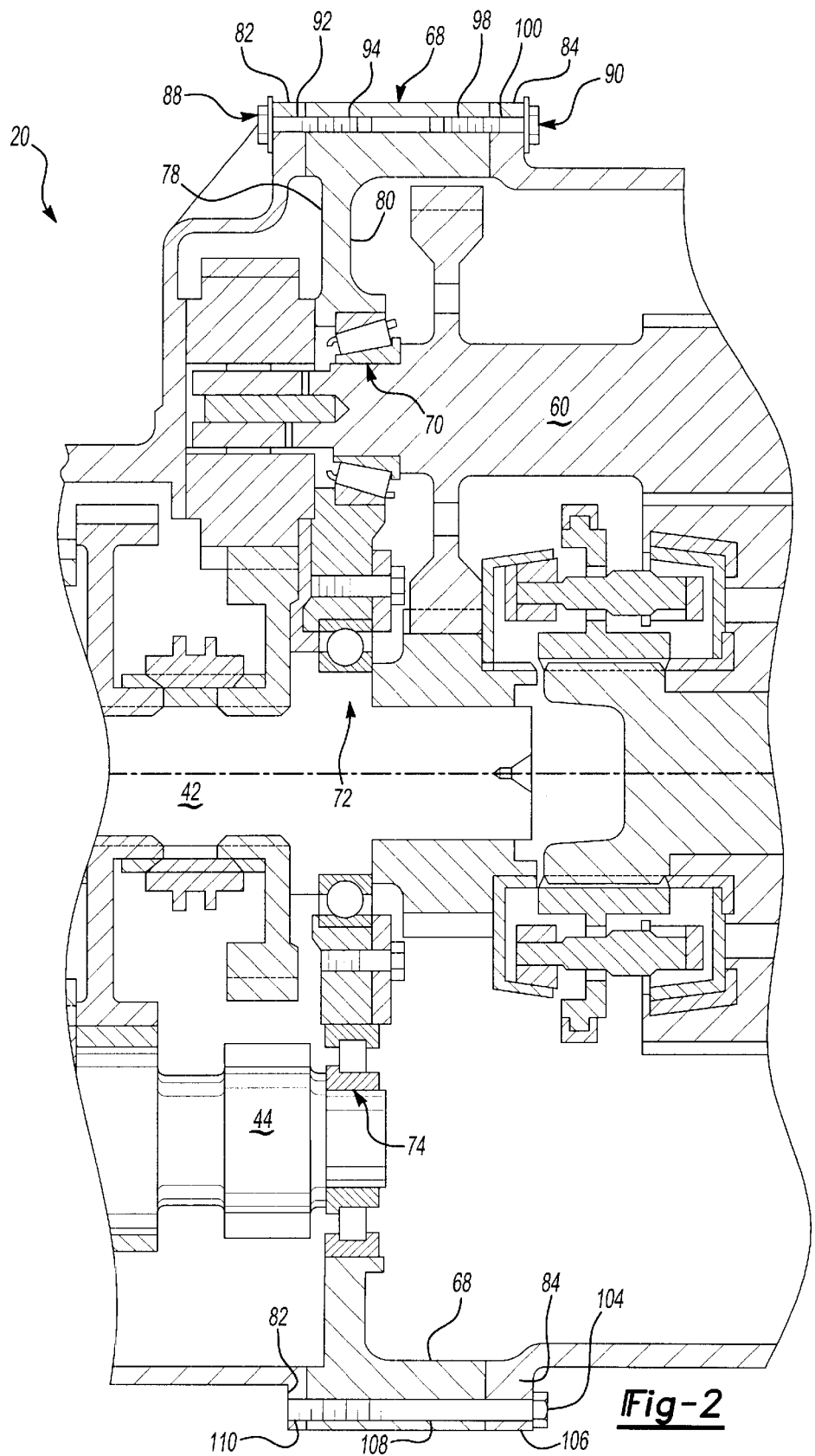
FIG. 2 is an enlarged view of the area surrounding the intermediate plate of FIG. 1.

As can be seen more clearly in FIG. 2, the intermediate plate 68 includes a front surface 78 facing the main section 22 and a rear surface 80 facing the auxiliary section 26. The sidewall 32 of the main case 24 includes a flange 82 about its periphery adjacent the intermediate plate 68. Similarly, the sidewall 50 of the auxiliary case 28 includes a flange 84 about its periphery adjacent the intermediate plate 68. The main case 24 and auxiliary case 28 are removably secured to the intermediate plate by a plurality of short bolts 88, 90 respectively. Short bolts 88 (preferably three) are inserted through apertures 92 in the flange 82 in the main case 24 and threadably secured in threaded bores 94 extending into the intermediate plate 68 from the front surface 78. Similarly, short bolts 90 are inserted through apertures 98 in the auxiliary case flange 84 and threadably secured in threaded bores 100 extending into the intermediate plate 68 from the rear surface 80. Additionally, a plurality of long bolts 104 (preferably eighteen) are inserted through apertures 106 in the auxiliary case flange 84 and apertures 108 in the intermediate plate 68 and threaded into threaded bores 110 in the main case flange 82.

Figure 3:
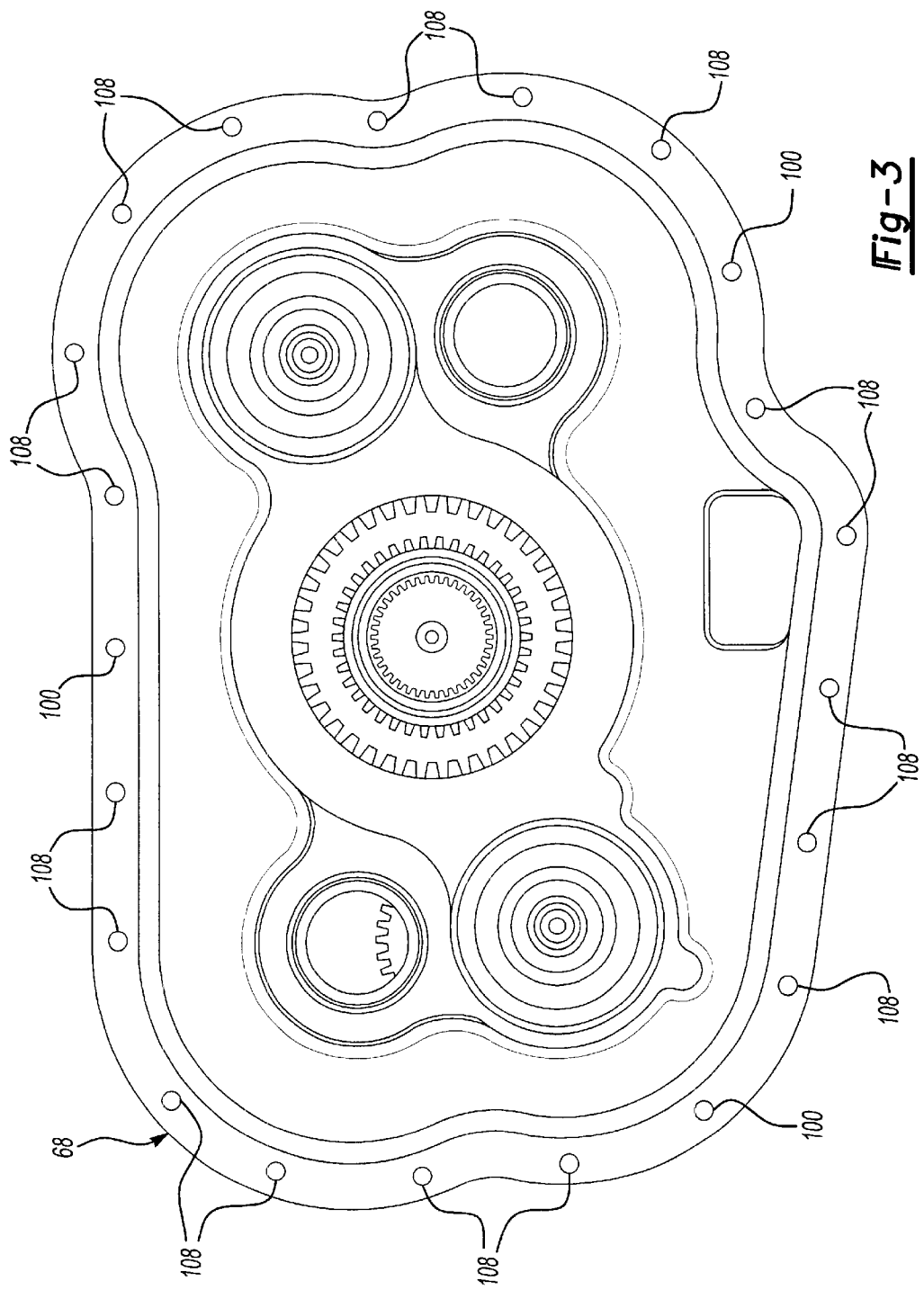
FIG. 3 is a view taken along line 3—3 of FIG. 1.

As can be seen in FIG. 3, the apertures 108 through intermediate plate 68 receiving long bolts 104 are preferably generally equally spaced about the periphery of the intermediate plate 68. The threaded bores 100 are preferably generally equally spaced about the periphery of the intermediate plate 68 and receive short bolts 90.

Referring to FIG. 1, during assembly, the main case 24 is placed with the forward wall 34 on a horizontal surface. The main section 22 is assembled through the rear opening 36 in the main case 24 by mounting the input shaft 38 in the input bearing 40 in the forward wall 34, and the main countershafts 44 in the main countershafts bearings 46 in the forward wall 34. The main shaft 42 is mounted in the input shaft 38. The intermediate plate 68 is then secured to the main case by inserting short bolts 88 through the apertures 92 in the main case flange 82 and threading the short bolts 88 into the threaded bores 94 in the intermediate plate 68.

The auxiliary section 26 is then assembled to the intermediate plate 68 by mounting the auxiliary shaft 56 adjacent the main shaft 42 and the auxiliary countershafts 60 in the auxiliary countershaft bearings 70 in the intermediate plate 68. The auxiliary case 28 is then placed over the auxiliary section 26, substantially enclosing the auxiliary section 26. The auxiliary shaft 56 is inserted into the auxiliary bearing 58 in the rearward wall 52 of the auxiliary case 28. The auxiliary countershafts 60 are rotatably supported by the auxiliary countershaft bearings 62 in the rearward wall 52 of the auxiliary case 28. The auxiliary case 28 is then secured to the intermediate plate 68 using short bolts 90.inserted through apertures 98 in the auxiliary case flange 84 and threaded into threaded bores 100. The long bolts 104 are then inserted through the apertures in the auxiliary case flange 84, the apertures 108 in the intermediate plate 68 and threaded into threaded bores 110 in the main case flange 82.

The main section 22 and auxiliary section 26 can each be serviced independently without disturbing the other. The main case 24 can be removed from the intermediate plate 68 by removing the long bolts 104 and the short bolts 88, leaving short bolts 90 to retain the auxiliary case 28 to the intermediate plate 68. Likewise, the auxiliary section 26 can be accessed without disturbing the main section 22. The auxiliary case 28 can be removed by removing long bolts 104 and short bolts 90 leaving short bolts 88 to retain the main case 24 to the intermediate plate 68.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A transmission comprising:
a main case substantially enclosing a main section of said transmission and defining a rear opening;
an auxiliary case substantially enclosing an auxiliary section of said transmission and defining a forward opening wherein said intermediate plate is removably mounted to said auxiliary case over said forward opening;
an intermediate plate between said main case and said auxiliary case, said intermediate plate removably mounted to said main case over said rear opening wherein said auxiliary case is removable from said transmission without removing said main case; and;
a first plurality of fasteners removably connecting said main case to said intermediate plate but not connecting said intermediate plate to said auxiliary case.

2. The transmission of claim 1 further including a second plurality of fasteners removably connecting said auxiliary case to said intermediate plate but not connecting said intermediate plate to said main case.

3. The transmission of claim 2 further including a third plurality of fasteners removably connecting said auxiliary case to said intermediate plate and said main case.

4. The transmission of claim 2 wherein said intermediate plate includes at least one first threaded bore extending into said intermediate plate from a front surface at least one second threaded bore extending into said intermediate plate from a rear surface, said transmission further including a threaded fastener threaded into each of said first bores and said second bores, said threaded fasteners in said first bores securing said main case to said intermediate plate, said threaded fasteners in said second bores securing said auxiliary case to said intermediate plate.

5. The transmission of claim 4 wherein each of said first threaded bores is coaxial with one of said second threaded bores.

6. The transmission of claim 2 further including a plurality of threaded fasteners extending through apertures in said intermediate plate and one of said main case and said auxiliary case and threaded into a plurality of threaded bores in the other of said main case and said auxiliary case.

7. A transmission comprising:
a main case having a sidewall defining a rear opening;
a mainshaft in said main case;
a main countershaft radially spaced from said mainshaft and mounted in said main case;
an auxiliary case having a sidewall defining a forward opening;
an auxiliary shaft mounted in said auxiliary case;
an auxiliary countershaft radially spaced from said auxiliary shaft and mounted in said auxiliary case,
an intermediate plate removably mounted over said rear opening of said main case;
said auxiliary case removably mounted to said intermediate plate over said forward opening of said auxiliary case;
a first plurality of fasteners removably connecting said main case to said intermediate plate but not connecting said intermediate plate to said auxiliary case;
a mainshaft bearing mounted in said intermediate plate rotatably supporting said mainshaft; and
at least two countershaft bearings mounted in said intermediate plate rotatably supporting said main countershaft and said auxiliary countershaft.

8. A transmission comprising:
a main case having a sidewall defining a rear opening;
a mainshaft in said main case;
a main countershaft radially spaced from said mainshaft and mounted in said main case;
an auxiliary case having a sidewall defining a forward opening;
an auxiliary shaft mounted in said auxiliary case;
an auxiliary countershaft radially spaced from said auxiliary shaft and mounted in said auxiliary case;
an intermediate plate removably mounted over said rear opening of said main case;
said auxiliary case removably mounted to said intermediate plate over said forward opening of said auxiliary case;
a first plurality of fasteners removably connecting said main case to said intermediate plate but not connecting said intermediate plate to said auxiliary case;
a second plurality of fasteners removably connecting said auxiliary case to said intermediate plate but not connecting said intermediate plate to said main case; and
a third plurality of fasteners removably connecting said auxiliary case to said intermediate plate and said main case.

9. The transmission of claim 8 wherein said main case is removable from said transmission without removing said auxiliary case.

10. The transmission of claim 8 wherein said auxiliary case is removable from said transmission without removing said main case.

11. A transmission comprising:

a main case having a sidewall defining a rear opening;

a mainshaft in said main case;

a main countershaft radially spaced from said mainshaft and mounted in said main case;

an auxiliary case having a sidewall defining a forward opening; an auxiliary shaft mounted in said auxiliary case; an auxiliary countershaft radially spaced from said auxiliary shaft and mounted in said auxiliary case;

an intermediate plate removably mounted over said rear opening of said main case;

said auxiliary case removably mounted to said intermediate plate over said forward opening of said auxiliary case;

a mainshaft bearing mounted in said intermediate plate rotatably supporting said mainshaft; and at least two countershaft bearings mounted in said intermediate plate for rotatably supporting said main countershaft and said auxiliary countershaft wherein said mainshaft bearing and said countershaft bearings are coplanar.

12. The transmission of claim 11 wherein said main case is removable from said transmission without removing said auxiliary case.

13. The transmission of claim 11 wherein said auxiliary case is removable from said transmission without removing said main case.

* * * * *

UNITED STATES PATENT AND TRADEMARK OFFICE
CERTIFICATE OF CORRECTION

PATENT NO. : 6,499,379 B1
DATED : December 31, 2002
INVENTOR(S) : Louzon et al.

It is certified that error appears in the above-identified patent and that said Letters Patent is hereby corrected as shown below:

<u>Title page,</u>
Item [73], please change the Assignee to read as follows:
-- [73] Assignee: ZF Meritor, LLC.
  Laurinburg, NC (US) --

Signed and Sealed this

Twenty-second Day of July, 2003

JAMES E. ROGAN
*Director of the United States Patent and Trademark Office*